(12) United States Patent
Watanabe et al.

(10) Patent No.: US 11,463,599 B2
(45) Date of Patent: Oct. 4, 2022

(54) COMMUNICATION APPARATUS

(71) Applicant: CANON KABUSHIKI KAISHA, Tokyo (JP)

(72) Inventors: Tokiko Watanabe, Tokyo (JP); Yoshiyuki Hirai, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 16/939,817

(22) Filed: Jul. 27, 2020

(65) Prior Publication Data
US 2021/0037160 A1 Feb. 4, 2021

(30) Foreign Application Priority Data

Jul. 29, 2019 (JP) .............................. JP2019-139165

(51) Int. Cl.
*G06F 3/12* (2006.01)
*H04N 1/00* (2006.01)
*H04W 52/02* (2009.01)
*H04W 88/08* (2009.01)

(52) U.S. Cl.
CPC ..... *H04N 1/00909* (2013.01); *H04N 1/00896* (2013.01); *H04W 52/0206* (2013.01); *H04W 52/0209* (2013.01); *H04W 88/08* (2013.01)

(58) Field of Classification Search
CPC .......... H04N 1/00909; H04N 1/00896; H04W 52/0206; H04W 52/0209; H04W 88/08; H04W 88/12
See application file for complete search history.

(56) References Cited

U.S. PATENT DOCUMENTS

| | | | |
|---|---|---|---|
| 2016/0224290 A1* | 8/2016 | Suzuki | G06F 3/1292 |
| 2017/0171414 A1* | 6/2017 | Naito | H04N 1/00212 |
| 2019/0253582 A1* | 8/2019 | Park | H04W 88/02 |

FOREIGN PATENT DOCUMENTS

JP 2015-023440 A 2/2015

* cited by examiner

*Primary Examiner* — Moustapha Diaby
(74) *Attorney, Agent, or Firm* — Canon U.S.A., Inc. IP Division

(57) ABSTRACT

A communication apparatus configured not to execute displaying, based on the operation in the connection setting state being started, a screen for receiving an operation for stopping the operation in the connection setting state on a display unit of the communication apparatus.

20 Claims, 9 Drawing Sheets

FIG.7

PRINTER IS EXECUTING
CONNECTION PROCESS.
PLEASE DO NOT TURN OFF
POWER SUPPLY. ~701

CONNECTION IS SUCCESSFUL. ~702

CONNECTION IS FAILED. ~703

FIG.8

SETUP OF PRINTER IS COMPLETED.
NOW COPIES CAN BE MADE. ~801

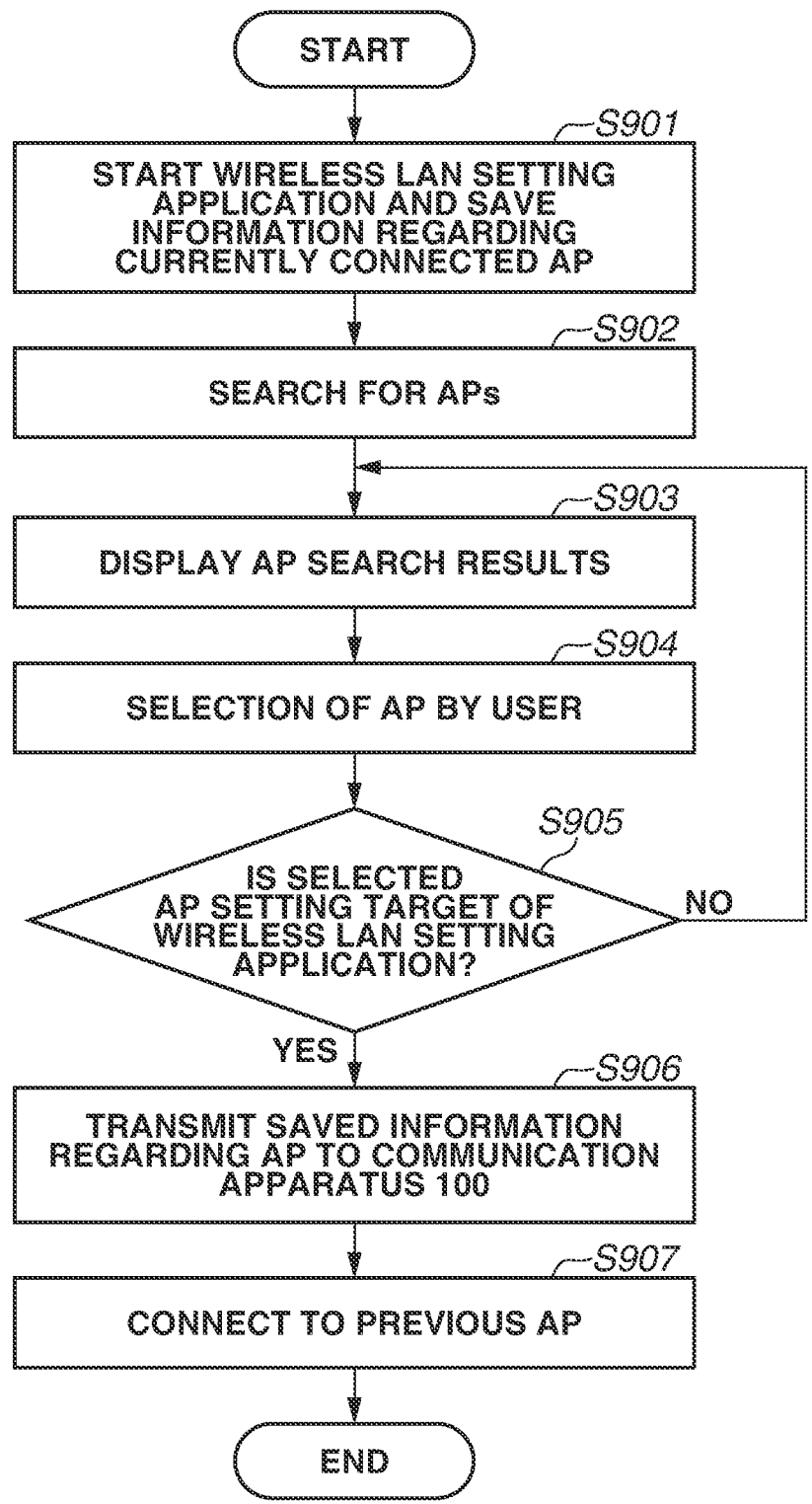

COMMUNICATION APPARATUS

BACKGROUND

Field of the Disclosure

The present disclosure relates to a communication apparatus.

Description of the Related Art

A communication apparatus, such as a printer, that communicates with a terminal apparatus, such as a personal computer (PC) or a smartphone, is known. Such a communication apparatus executes, for example, a connection setting process for communicating with a terminal apparatus using a predetermined communication method, such as Wi-Fi®. At this time, the communication apparatus operates in a connection setting state (connection setting mode), which is a state for executing the connection setting process.

Japanese Patent Application Laid-Open No. 2015-023440 discusses a technique in which a communication apparatus that operates in a software access point (AP) mode receives an apparatus information setting command and sets an operation mode based on the received command.

Incidentally, a user may unintentionally execute a stop operation for stopping an operation in a connection setting state. Thus, an operation in a connection setting state may be stopped based on a stop operation unintentionally executed by a user.

SUMMARY

The present disclosure concerns a communication apparatus capable of preventing an operation in a connection setting state from being stopped based on a stop operation unintentionally executed by a user.

According to an aspect of some embodiments of the present disclosure, a communication apparatus includes a first control unit configured to cause the communication apparatus to start operating in a connection setting state for receiving connection information for connecting to an external apparatus from a terminal apparatus, a reception unit configured to receive the connection information from the terminal apparatus in a state where the communication apparatus operates in the connection setting state, an establishment unit configured to, in a case where the connection information is received from the terminal apparatus, establish a connection between the external apparatus and the communication apparatus using the connection information, and a second control unit configured to, based on a reception of the connection information from the terminal apparatus, cause the communication apparatus to stop operating in the connection setting state, wherein displaying, based on the operation in the connection setting state being started, a screen for receiving an operation for stopping the operation in the connection setting state on a display unit of the communication apparatus is not executed.

According to another aspect of some embodiments, a communication apparatus includes a first control unit configured to cause the communication apparatus to start operating in a connection setting state for receiving from a terminal apparatus connection information for connecting to an external apparatus, a reception unit configured to receive the connection information from the terminal apparatus in a state where the communication apparatus operates in the connection setting state, an establishment unit configured to, in a case where the connection information is received from the terminal apparatus, establish a connection between the external apparatus and the communication apparatus using the connection information, a second control unit configured to, based on the reception of the connection information from the terminal apparatus, cause the communication apparatus to stop operating in the connection setting state, and a stop unit configured to, based on a stop button for stopping processing that is being executed by the communication apparatus being pressed, stop the processing being executed by the communication apparatus, wherein the communication apparatus does not stop operating in the connection setting state, even in a case where the stop button is pressed.

Further features of various embodiments will become apparent from the following description of exemplary embodiments with reference to the attached drawings.

BRIEF DESCRIPTION OF THE DRAWINGS

FIG. 7 illustrates examples of screens displayed by the communication apparatus.

FIG. 8 illustrates an example of a screen displayed by the communication apparatus.

FIG. 9 is a flowchart illustrating a connection setting process executed by a terminal apparatus.

DESCRIPTION OF THE EMBODIMENTS

Exemplary embodiments will be described below with reference to the drawings. Regarding the embodiments, it should be understood that appropriate changes and improvements in the following exemplary embodiments based on the normal knowledge of a person skilled in the art without departing from the spirit of the present disclosure are also included in the scope of the present disclosure.

A communication apparatus according to the present exemplary embodiments is described. In the present exemplary embodiments, a printer (a printing apparatus) is illustrated as an example of the communication apparatus. Some embodiments are not limited thereto. Alternatively, various apparatuses can be used as the communication apparatus so long as the apparatuses can connect to a terminal apparatus. For example, in a case of a printer, the communication apparatus can be an inkjet printer, a full-color laser beam printer, and a monochrome printer. The communication apparatus can be not only the printer, but also a copying machine, a facsimile machine, a mobile terminal, a smartphone, a personal computer (PC), a tablet terminal, a personal digital assistant (PDA), a digital camera, and a smart speaker. The "smart speaker" refers to an apparatus that, in response to a voice issued by a user, instructs a device present on the same network to perform certain processing, or in response to a voice uttered by a user, notifies the user of information acquired via a network. Additionally, the communication apparatus can also be a multifunction peripheral having a copy function, a facsimile function, and a print function. In the present exemplary embodiments, a PC is illustrated as an example of the terminal apparatus. Some embodiments are not limited thereto. Alternatively, the terminal apparatus can be various apparatuses, such as a mobile terminal, a smartphone, a tablet terminal, a personal digital assistance (PDA), and a digital camera.

Figure 1:
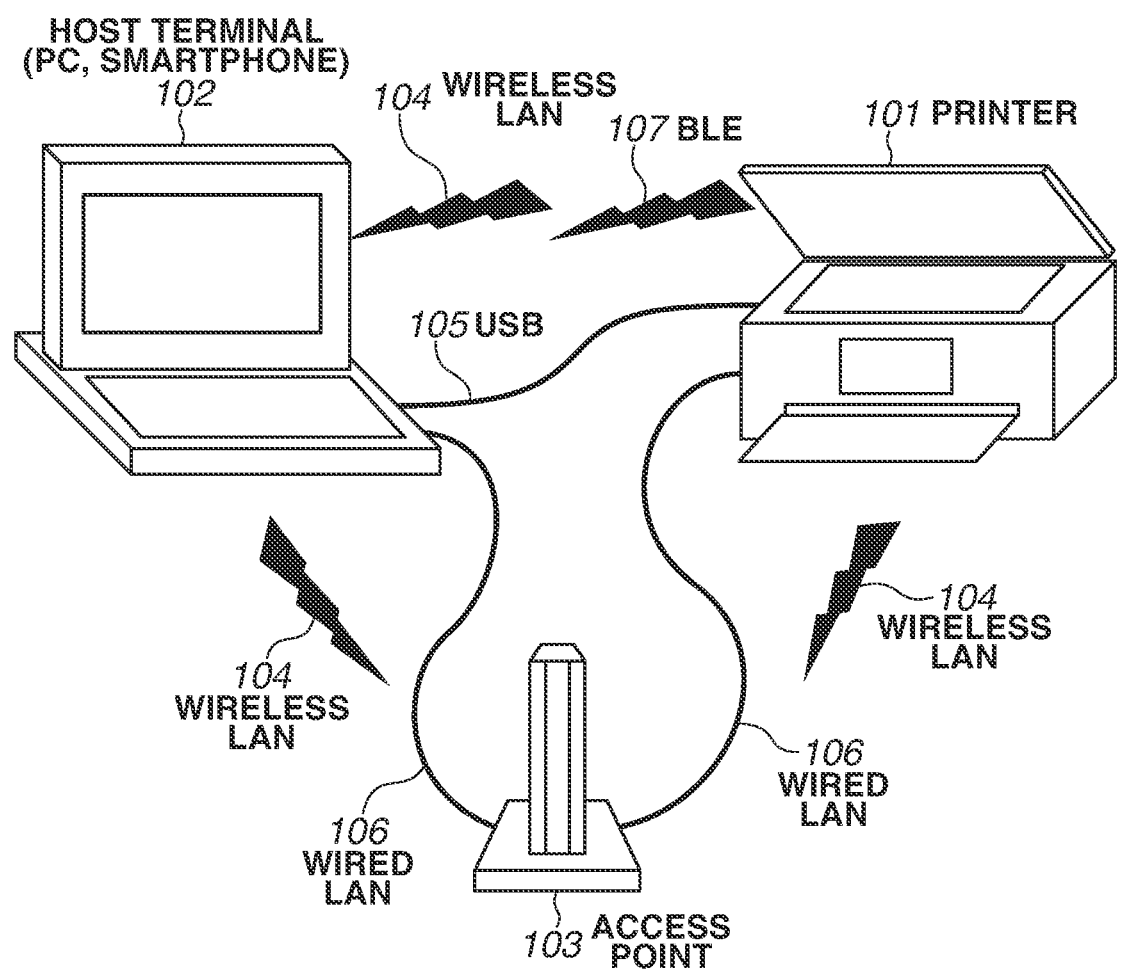
FIG. 1 is a schematic diagram of a communication system.

FIG. 1 is a schematic diagram of a communication system according to a first exemplary embodiment.

The communication system according to the present exemplary embodiment includes a printer 101, a host terminal 102, and an access point (hereinafter, "AP") 103. The printer 101 is a communication apparatus according to the present exemplary embodiment. The host terminal 102 is a terminal apparatus according to the present exemplary embodiment. The AP 103 is an external access point present outside the terminal apparatus and the communication apparatus, and for example, is a wireless local area network (LAN) router. The terminal apparatus can communicate, via the external access point, with the communication apparatus connected to the external access point and with the Internet.

In the present exemplary embodiment, the printer 101 can wirelessly connect to the host terminal 102 using a direct connection method for directly connecting to the host terminal 102 in a peer-to-peer manner not via the AP 103. The printer 101 can also wirelessly connect to the host terminal 102 using an infrastructure connection method for connecting to the host terminal 102 via the AP 103. A communication standard used in each connection method is not particularly limited. A wireless LAN 104 based on a communication standard of the Institute of Electrical and Electronics Engineers (IEEE) 802.11 series may be used. Alternatively, for example, Universal Serial Bus (USB) 105, a wired LAN 106, or Bluetooth® Low Energy (BLE) 107 may be used.

Figure 2:
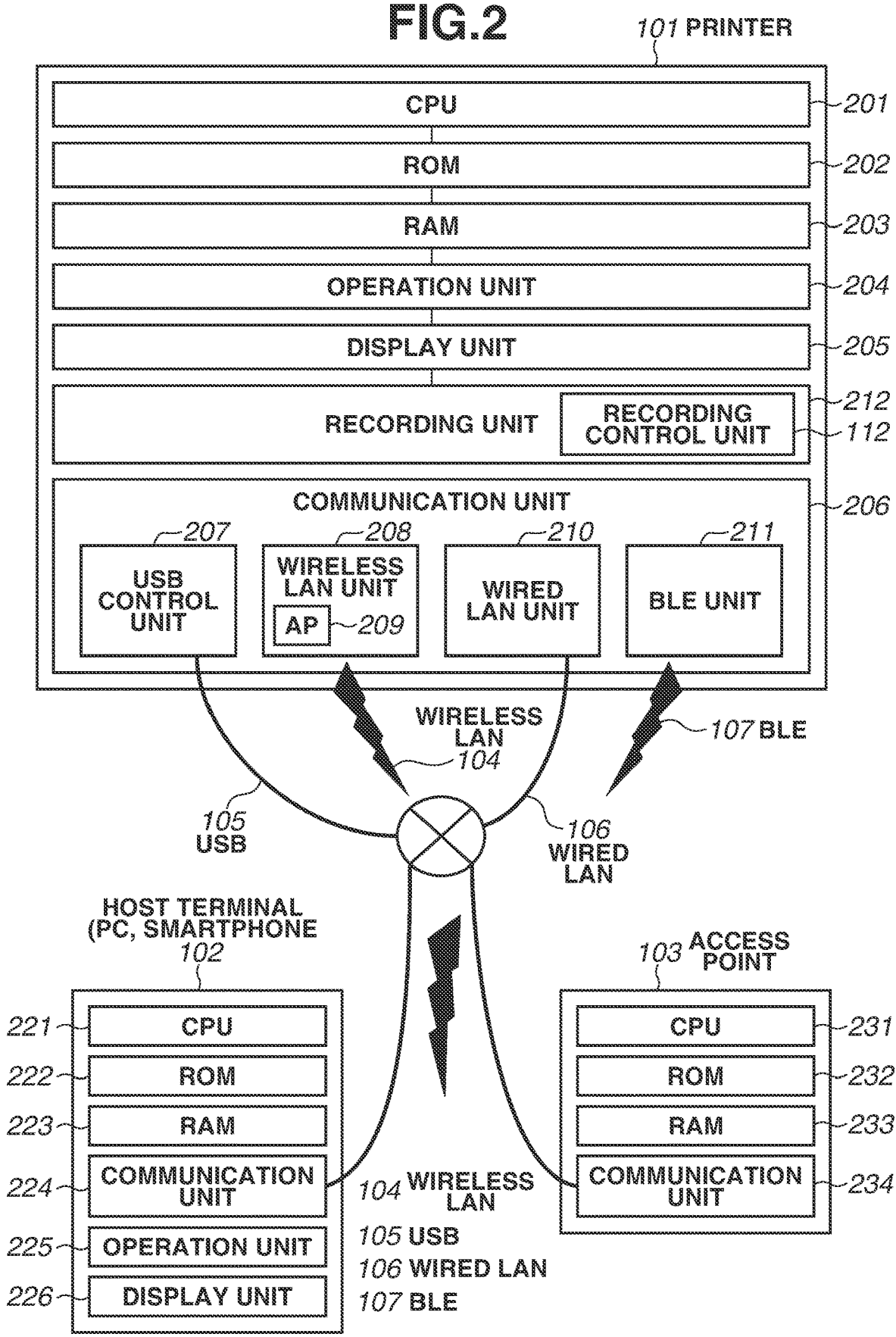
FIG. 2 is a block diagram illustrating hardware configurations of apparatuses included in the communication system.

FIG. 2 is a block diagram illustrating hardware configurations of the printer 101, the host terminal 102, and the AP 103.

The printer 101 includes a central processing unit (CPU) 201, a read-only memory (ROM) 202, a random-access memory (RAM) 203, an operation unit 204, a display unit 205, a recording unit 212, and a communication unit 206. A computer of the printer 101 is formed of the CPU 201, the ROM 202, and the RAM 203.

The CPU 201 is a system control unit and entirely controls the printer 101.

The ROM 202 stores fixed data such as control programs to be executed by the CPU 201, a data table, and an embedded operating system (OS) program. In the present exemplary embodiment, the control programs stored in the ROM 202 control the execution of software, such as scheduling, a task switch, and an interrupt process, under control of the embedded OS program stored in the ROM 202.

The RAM 203 is composed of a static random-access memory (SRAM), which requires a backup power supply. The RAM 203 holds data using a primary battery for data backup (not illustrated). The RAM 203 stores program control variables. In the RAM 203, a memory area is also provided for storing a setting value registered by the user, such as a wireless LAN setting, management data of the printer 101, and information indicating whether it is a first time when the printer 101 is set after the power supply of the printer 101 is turned on (hereinafter, "initial setting time"). In other words, the initial setting time is an initial setting state where the printer 101 has never executed an initial-setting-time cleaning process.

The operation unit 204 is a unit for receiving an operation from the user and includes keys and buttons, such as a numerical input button, a mode setting button, a determination button, an undo button, a cancel button (stop button), and a home button. The various keys and buttons included in the operation unit 204 may be physical keys or physical buttons, or may be software keys and software buttons displayed by software. The cancel button is a button for cancelling (stopping) processing that is being executed by the printer 101. For example, if the cancel button is pressed in a state where the printer 101 is executing printing, the printing is cancelled. The display unit 205 is a component for presenting information to the user and composed of a light-emitting diode (LED) or a liquid crystal display (LCD). In the present exemplary embodiment, the display unit 205 for presenting information is composed of an LED segment display, and the keys for receiving an operation from the user are composed of physical buttons. The printer 101 can start various functions of the printer 101 and make various settings of the printer 101 by being operated by the user through the operation unit 204. Alternatively, a configuration in which the display unit 205 does not include a display portion composed of an LED or an LCD may be employed. Yet alternatively, a configuration in which the display unit 205 includes a display portion composed of an LED, but does not include a display portion composed of an LCD, may be employed. In this case, for example, the printer 101 gives various notifications by causing the LED to blink. Yet alternatively, a configuration in which the operation unit 204 and the display unit 205 are integrated using an operation display portion composed of a touch panel, may be employed.

In the present exemplary embodiment, the display unit 205 displays various screens. More specifically, the display unit 205 displays, for example, a home screen and various notification screens. The home screen is a screen that is displayed on the display unit 205 when the printer 101 starts (normally starts) in a state where it is not the initial setting time. The home screen is a screen that is displayed on the display unit 205 when the home button of the operation unit 204 is pressed. The home screen is also a screen that is displayed after an initial setting process is completed. The user can select various icons, such as keys and buttons, included in the home screen to instruct the printer 101 to perform various processes. For example, the user can instruct the printer 101 to perform printing, copying, and scanning. The user can also instruct the printer 101 to perform a setting process for causing the printer 101 to use an interface selected by the user.

The recording unit 212 is a recording unit composed of a laser beam printer or an inkjet printer and prints an image by applying recording agent onto a recording medium based on color image data or monochrome image data generated by a recording control unit 112. The recording medium to be used is not limited to paper, and various media such as a film may be used. The size and the shape of the recording medium to be used are not particularly limited, either. The recording agent to be used is ink or toner.

In the present exemplary embodiment, the printer 101 is an inkjet printer, and the recording unit 212 includes a recording head that discharges ink onto a recording medium, and an ink tank that holds ink to be supplied to the recording head. In the recording unit 212, an ink cartridge may be used in which the recording head and the ink tank are integrally formed. The recording unit 212 includes a carriage to and from which the ink cartridge is attached and detached and which scans the recording medium when printing is performed. The printer 101 can detect whether the ink cartridge is already attached to the carriage using a cartridge sensor (detection unit) (not illustrated). Alternatively, the recording head and the ink tank may be formed as separate members and attached to attaching portions different from each other in the recording unit 212.

The printer 101 includes a cover that covers an opening portion of the printer 101. The cover is pivotable or movable between an opened position where the opening portion of the printer 101 is opened, and a closed position where the opening portion of the printer 101 is covered. The cover is located at the opened position, whereby the user can attach the ink cartridge to the recording unit 212 while visually confirming the inside of the printer 101 through the opening portion of the printer 101. The printer 101 includes a cover sensor (not illustrated) that detects whether the cover is located at the closed position. Then, if the cover sensor detects that the cover moves from the closed position, the printer 101 moves the carriage from a standby position to the position of the opening portion (cartridge attaching position). Then, the user attaches the ink cartridge to the carriage. Then, if the sensor detects that the cover returns to the closed position, the printer 101 moves the carriage from the cartridge attaching position to the standby position.

The communication unit 206 is a component for communicating with another apparatus.

A USB control unit 207 is a control unit that controls the connection of a USB interface and connects using a protocol defined by the USB connection standard. The USB connection standard is a standard that enables a two-way data connection at high speed. Using this standard, it is possible to connect a plurality of hubs or functions (slaves) to a single host (master). More specifically, the USB control unit 207 converts data from a USB function control task executed by the CPU 201 into a packet and transmits the USB packet to the host terminal 102. Further, the USB control unit 207 converts a USB packet from an external PC into data and transmits the data to the CPU 201.

A wireless LAN unit 208 connects to and communicates with a network (a network that enables a connection through the Transmission Control Protocol/Internet Protocol (TCP/IP)) terminal through a wireless connection. The wireless LAN unit 208 is a unit for wirelessly connecting to the AP 103 and the host terminal 102. The wireless LAN unit 208 can make a data (packet) connection in a wireless LAN (hereinafter, "WLAN") system compliant with the IEEE 802.11 series, for example. More specifically, the wireless LAN unit 208 can connect to and communicate with another apparatus using Wi-Fi®, for example.

A wired LAN unit 210 is a component for communicating using Ethernet® through a wired LAN cable.

A BLE unit 211 can connect to and communicate with another apparatus using BLE.

The printer 101 operates to be able to communicate via the wireless LAN unit 208 in a connection form corresponding to a communication mode by setting the communication mode for the printer 101. More specifically, in the present exemplary embodiment, the printer 101 executes communication in the connection form corresponding to the set communication mode, using the WLAN. The details of a connection setting process, which is a process of setting a communication mode, will be described below.

The host terminal 102 includes a CPU 221, a ROM 222, a RAM 223, a communication unit 224, an operation unit 225, and a display unit 226. The components of the host terminal 102 are similar to the components of the printer 101, and therefore are not described. The host terminal 102 can connect to the printer 101 and the AP 103 via the communication unit 224 based on a communication standard, such as the wireless LAN 104, the USB 105, the wired LAN 106, or the BLE 107.

The AP 103 includes a CPU 231, a ROM 232, a RAM 233, and a communication unit 234. The components of the AP 103 are similar to the components of the printer 101 described above, and therefore are not described. The AP 103 can connect to the printer 101 and the host terminal 102 via the communication unit 234 based on a communication standard, such as the wireless LAN 104, the USB 105, the wired LAN 106, or the BLE 107.

<Regarding Wi-Fi Communication (Direct Connection Mode)>

To establish a direct connection, which is a connection in a connection form using a peer-to-peer (P2P) method in communication using Wi-Fi, the printer 101 according to the present exemplary embodiment operates in a direct connection mode. As described above, a "direct connection" refers to a form in which apparatuses directly wirelessly connect to each other not via an external apparatus, such as the AP 103. The direct connection mode includes a software AP mode and a Wi-Fi Direct (WFD) mode. The printer 101 that is operating in the direct connection mode operates as a master station in a network to which the printer 101 belongs. In the present exemplary embodiment, a "master station" refers to an apparatus that constructs a wireless network and provides to a slave station a parameter used to connect to the wireless network. The parameter used to connect to the wireless network is, for example, a parameter regarding a communication channel used by the master station. The slave station can connect to the wireless network constructed by the master station, using the communication channel used by the master station by receiving the parameter.

WFD is a standard formulated by Wi-Fi Alliance. The host terminal 102 and the printer 101 that are WFD-compatible devices can directly wirelessly connect to each other not via an AP other than the host terminal 102 and the printer 101, using WFD. An apparatus that is a WFD-compatible device and functions as an AP (master station) is particularly referred to as a "group owner". Further, the mode of executing a direct connection using WFD is referred to as a "WFD mode".

The printer 101 also has a software AP function for operating as an AP. The printer 101 enables (starts) an AP 209 that is a software AP within the printer 101, and the host terminal 102 connects to the AP 209 using not WFD but normal Wi-Fi. The host terminal 102 and the printer 101 can directly wirelessly connect to each other not via an AP other than the host terminal 102 and the printer 101 by connecting the host terminal 102 and the printer 101 in this way. The mode of executing a direct connection by enabling the software AP within the printer 101 and operating is referred to as the "software AP mode". If the software AP mode stops, the printer 101 disables the software AP within the printer 101 and enters a state where the printer 101 cannot directly connect to another apparatus using the software AP.

In the direct connection mode, since the printer 101 operates as a master station, the printer 101 can determine which communication channel is to be used in communication in the direct connection mode. In a case where the printer 101 operates in, for example, an infrastructure connection mode and the direct connection mode in parallel, the printer 101 performs control so that a communication channel used in communication in the infrastructure connection mode is also used in communication in the direct connection mode. For example, the printer 101 may preferentially select a communication channel used to connect to the AP 103 as a channel used in communication in the direct connection mode, over other channels.

Connection information (Service Set Identifier (SSID) and password) for connecting to the printer 101 in the direct connection mode may be optionally changed by a user operation on the operation unit 204 included in the printer 101.

<Regarding Wi-Fi Communication (Infrastructure Connection Mode)>

To establish a connection in a connection form using an infrastructure method (infrastructure connection) in communication based on Wi-Fi, the printer 101 according to the present exemplary embodiment operates in an infrastructure connection mode. In the present exemplary embodiment, an "infrastructure connection" refers to a form in which an external apparatus that controls a network, such as the AP 103, operates as a master station, and apparatuses wirelessly connect to each other via the master station. The printer 101 that is operating in the infrastructure connection mode operates as a slave station in a network to which the printer 101 belongs.

By the infrastructure connection mode, the printer 101 and the host terminal 102 connect to each other via the AP 103. Thus, the printer 101 and the host terminal 102 can communicate with each other via the AP 103. A channel used in communication in the infrastructure connection mode in this case may be a frequency band (e.g., 5.0 GHz band) other than the 2.4 GHz frequency band.

To communicate with the printer 101 via the AP 103, the host terminal 102 needs to recognize that the printer 101 belongs to a network which is formed by the AP 103 and to which the host terminal 102 belongs. More specifically, the host terminal 102 transmits a search signal via the AP 103 to the network to which the host terminal 102 belongs. Then, the host terminal 102 confirms communication with the printer 101.

In the present exemplary embodiment, the state where the host terminal 102 and the printer 101 are simply connected to the same AP is regarded as an infrastructure connection state. More specifically, in the infrastructure connection state, the host terminal 102 and the printer 101 only need to be connected to the same AP, and each apparatus does not need to recognize that the partner apparatus belongs to the network to which the apparatus belongs.

In the present exemplary embodiment, the printer 101 can establish a direct connection and an infrastructure connection in parallel. In other words, the printer 101 can establish a Wi-Fi connection in which the printer 101 is a slave station and a Wi-Fi connection in which the printer 101 is a master station in parallel. An operation in the state where the above two connections are thus established in parallel is referred to as a "simultaneous operation". To execute a simultaneous operation, the printer 101 matches the frequency band and the communication channel used in the infrastructure connection to the frequency band and the communication channel used in the direct connection. In the present exemplary embodiment, however, in a case where the 5 GHz frequency band is used in an infrastructure connection, the printer 101 does not operate in the direct connection mode and does not execute a simultaneous operation. This is because in a case where the 5 GHz frequency band is used, there is a possibility that the communication channel to be used is changed by Dynamic Frequency Selection (DFS).

<Regarding Connection Setting Process>

In the present exemplary embodiment, using wireless communication with the printer 101, the host terminal 102 makes a setting (connection setting) for causing the printer 101 to operate in at least one of the infrastructure connection mode and the direct connection mode. The connection setting process in the present exemplary embodiment is executed through wireless communication and therefore is also termed "cableless setup (CLS)". Alternatively, the connection setting process may be executed through wired communication.

The printer 101 executes the connection setting process in a state where the printer 101 is operating in a connection setting mode (connection setting state), which is a mode for executing the connection setting process. The details of the connection setting mode will be described below.

When a predetermined program stored in the ROM 222 or an external storage device (not illustrated) is operating, the host terminal 102 performs the connection setting process. The predetermined program is an application program for setting an AP as the connection destination of the printer 101 and causing the printer 101 to print image data or document data in the host terminal 102. This program will be hereinafter referred to as a "setup program". The setup program may have other functions in addition to the function of setting the AP as the connection destination of the printer 101 and the print function. For example, the setup program may have the function of, in a case where the printer 101 has a scan function, causing the printer 101 to scan a document set in the printer 101, the function of making other settings of the printer 101, and the function of checking the state of the printer 101.

To connect the AP 103 and the printer 101 and cause the printer 101 to operate in the infrastructure connection mode, the host terminal 102 wirelessly transmits to the printer 101 infrastructure setting information for causing the printer 101 to operate in the infrastructure connection mode. The infrastructure setting information includes, for example, information regarding the AP 103. The information regarding the AP 103 is, for example, the SSID of the AP 103, a password for connecting to the AP 103, and information regarding the frequency band used by the AP 103.

On the other hand, to cause the printer 101 to operate in the direct connection mode, the host terminal 102 wirelessly transmits to the printer 101 direct setting information for causing the printer 101 to operate in the direct connection mode. The direct setting information includes an instruction to enable a WFD function and cause the printer 101 to operate as a group owner, and an instruction to enable the AP within the printer 101. The host terminal 102 acquires connection information for directly connecting to the printer 101 from the printer 101. The connection information for directly connecting to the printer 101 includes, for example, the SSID of the printer 101 and a password for connecting to the printer 101.

In the present exemplary embodiment, to transmit the infrastructure setting information or the direct setting information and acquire the information for directly connecting to the printer 101 in the connection setting process, a direct connection for the connection setting between the host terminal 102 and the printer 101 is used. In the present exemplary embodiment, the direct connection for the connection setting includes two connections, i.e., a connection using Wi-Fi and a connection using BLE. In other words, in the present exemplary embodiment, the host terminal 102 can execute the connection setting process using Wi-Fi and the connection setting process using BLE.

As the direct connection for the connection setting, for example, a wireless communication standard other than Wi-Fi and BLE, such as Classic Bluetooth, may be used, or a wired communication standard, such as the wired LAN or USB, may be used.

After an infrastructure connection or a direct connection using Wi-Fi is established between the host terminal 102 and the printer 101 by the connection setting process, the host terminal 102 and the printer 101 can communicate with each other through the established connection. More specifically, for example, the host terminal 102 can transmit to the printer 101 a print job for causing the printer 101 to execute printing or a scan job for causing the printer 101 to execute scanning through the established connection.

<Regarding Connection Setting Mode>

As described above, the printer 101 can operate in the connection setting mode. A trigger for the printer 101 to start operating in the connection setting mode may be, for example, pressing of a button for the connection setting mode by the user, or starting (turned on) of the printer 101 for the first time after the arrival of the printer 101. The button for the connection setting mode may be a hardware button included in the printer 101, or may be a software button displayed on the display unit 205 by the printer 101.

When the printer 101 starts operating in the connection setting mode, the printer 101 enables both Wi-Fi communication and BLE communication. More specifically, as an enabling process for enabling Wi-Fi communication, the printer 101 enables the AP 209 dedicated to the connection setting mode (connection setting AP) within the printer 101. Consequently, the printer 101 enters the state where the printer 101 can establish a direct connection to the host terminal 102 using Wi-Fi. Connection information (SSID and password) for connecting to the connection setting AP is held in advance in the setup program installed on the host terminal 102, and the host terminal 102 recognizes the connection information for connecting to the connection setting AP in advance. For this reason, unlike connection information regarding an AP that is enabled in the direct connection mode, the user cannot optionally change the connection information for connecting to the connection setting AP. In the connection setting mode, the printer 101 may connect to the host terminal 102 using not normal Wi-Fi but WFD. In other words, the printer 101 may operate as a group owner and receive setting information from the host terminal 102 through communication using WFD.

As an enabling process for enabling BLE communication, the printer 101 starts transmitting advertisement information. With this operation, the printer 101 enters the state where the printer 101 can establish a connection to the host terminal 102 using BLE. In the present exemplary embodiment, in a predetermined period after the BLE communication is enabled, the printer 101 can receive a pairing request using BLE. Then, if the printer 101 receives a pairing request using BLE within the predetermined period, the printer 101 performs pairing with an apparatus as the transmission source of the pairing request and establishes a BLE connection. If the printer 101 does not receive a pairing request using BLE within the predetermined period, the printer 101 may disable the BLE communication.

When the printer 101 enables both Wi-Fi communication and BLE communication in the connection setting mode, the printer 101 receives setting information through the Wi-Fi communication and BLE communication and executes processing corresponding to the received setting information.

<Process Executed at Initial-Setting-Time>

Figure 3:
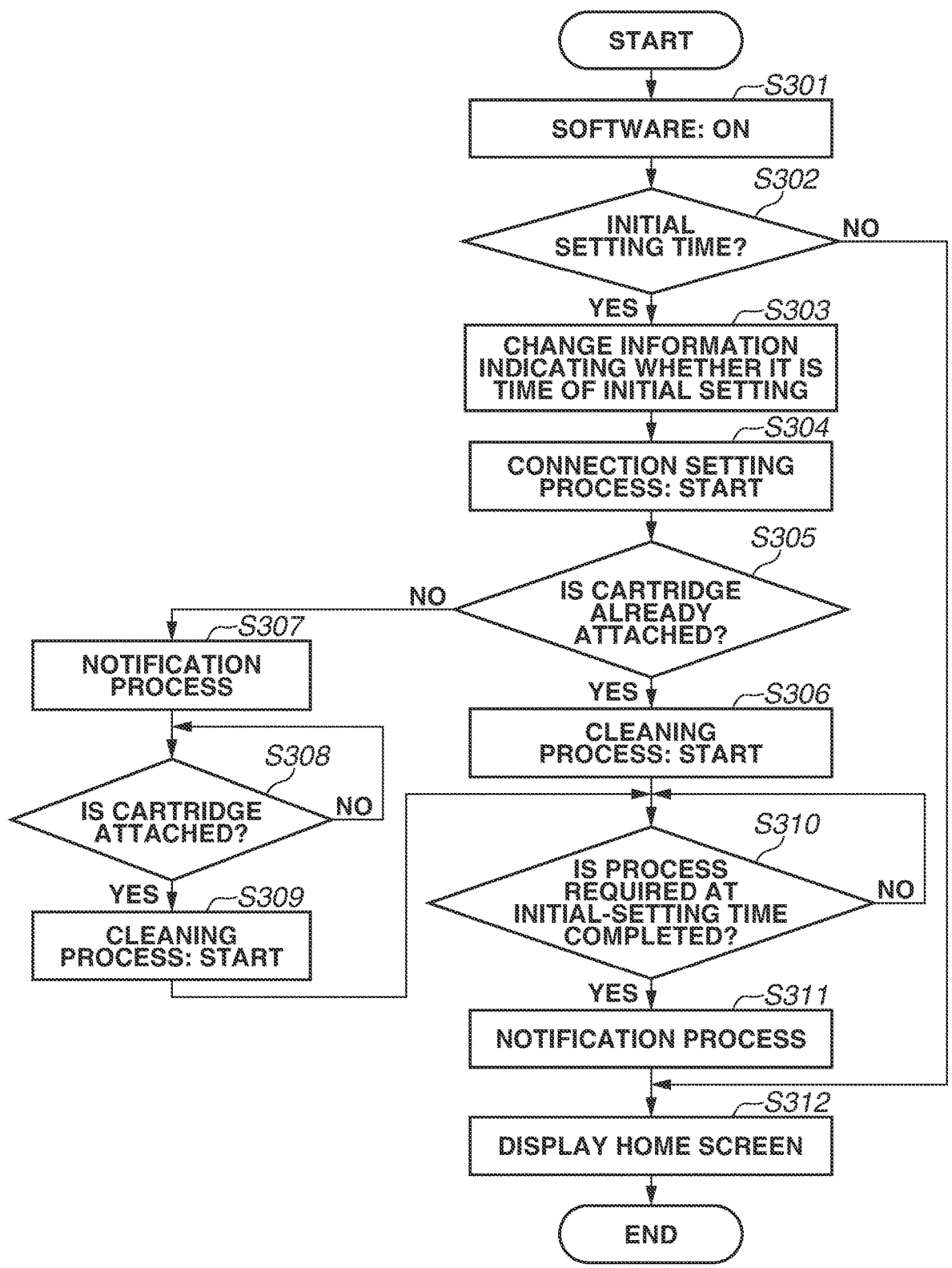
FIG. 3 is a flowchart illustrating an initial setting process executed by a communication apparatus.

FIG. 3 is a flowchart illustrating an initial setting process executed by the printer 101 according to the present exemplary embodiment. This flowchart is implemented by the CPU 201 loading a control program regarding the flowchart stored in the ROM 202 or an external storage device (not illustrated) into the RAM 203 and executing the control program. This flowchart is started when the printer 101 is in a power supply off state.

First, in S301, if the CPU 201 detects that a power button included in the printer 101 is pressed (a power supply-on operation is executed), the CPU 201 shifts the printer 101 from the power supply off state to a power supply-on state.

Next, in S302, with reference to information saved in the RAM 203 and indicating whether it is an initial setting time, the CPU 201 determines whether it is the initial setting time. More specifically, if the user starts the printer 101 for the first time after the arrival of the printer 101, an initial-setting-time flag is on in the RAM 203. On the other hand, in a start process for starting the printer 101 from the second time and the subsequent times after the arrival of the printer 101, the initial-setting-time flag is off in the RAM 203. The CPU 201 achieves the determination in S302 by referring to on or off of the e initial-setting-time flag. This determination may be made by, for example, determining whether the printer 101 has executed a time-of-arrival sequence in the past.

If the current time is not the initial setting time (NO in S302), the CPU 201 does not execute the connection setting process, and the processing proceeds to S312. Except in a case where the connection environment of the printer 101 changes, normally, if it is not the initial setting time, a communication mode does not need to be set again. Thus, in such a form, it is possible to avoid the situation where every time the printer 101 shifts to a software-on state, the process of setting a communication mode is performed. At this time, a user interface (UI) for inquiring of the user about whether to perform the process of setting a communication mode may be displayed, and the process of setting a communication mode may be performed based on the reply of the user.

On the other hand, if it is the initial setting time (YES in S302), the processing proceeds to S303. In S303, the CPU 201 changes the information indicating whether it is the initial setting time, thereby enabling an indication that the time when the printer 101 shifts to the software-on state from the next time and thereafter is not the initial setting time. More specifically, the CPU 201 changes the content of the initial-setting-time flag. In the present exemplary embodiment, the process of S302 is executed using the on and off states of the initial-setting-time flag. Alternatively, information other than the flag may be used. In this case, for example, information indicating the initial setting time is saved in the RAM 203 at the time of the arrival of the printer 101. Then, in S302, it is determined whether the information indicating that the initial setting time is saved in the RAM 203. In a subsequent process, the information indicating that it is the initial setting time is deleted. The process of S303 may be performed at any time after the determination of whether it is the initial setting time.

In S304, the CPU 201 starts the connection setting process. The details of the connection setting process started by this process will be described below with reference to FIG. 4. The following processing is executed in parallel with the connection setting process started by this process.

In S305, based on the detection result of the detection unit, the CPU 201 determines whether the ink cartridge is already attached to the recording unit 212. In the form in which the recording head and the ink tank are formed as separate members, it is determined whether at least the recording head is already attached to the recording unit 212. If the ink cartridge is already attached (YES in S305), the processing proceeds to S306. If the ink cartridge is not yet attached (NO in S305), the processing proceeds to S307.

On the other hand, if the determination is NO in S305, the ink cartridge is not yet attached to the recording unit 212 before the printer 101 shifts to the power supply-on state (i.e., when the printer 101 is in the power supply off state).

In this case, in S307, the CPU 201 causes the LED of the display unit 205 to blink or displays a particular screen on the LCD of the display unit 205, thereby giving the user a notification regarding the recording unit 212. More specifically, the CPU 201 notifies the user that the printer 101 is in a state of waiting the ink cartridge to be attached, or notifies the user of an attachment method for attaching the ink cartridge. The notification method is not particularly limited. For example, the CPU 201 may give the notification by voice or sound using a speaker (not illustrated).

Then, in S308, based on the detection result of the detection unit, the CPU 201 determines whether the ink cartridge is attached to the recording unit 212. In the form in which the recording head and the ink tank are formed as separate members, it is determined whether both the recording head and the ink tank are attached to the recording unit 212. If the ink cartridge is attached (YES in S308), the processing proceeds to S309. If the ink cartridge is not attached (NO in S308), the CPU 201 executes the process of S308 again. A timeout is not set for the determination in S308. Thus, the determination in S308 is repeated until the determination result becomes YES, or the printer 101 shifts to the power supply off state. The CPU 201 may continue to give the notification in S307 until the determination result becomes YES in S308.

In S306 and S309, the CPU 201 starts an initial-setting-time cleaning process. More specifically, first, the CPU 201 moves the carriage to the position where cleaning members, such as a waste ink absorption band and a capping mechanism for capping a discharge port of the recording head, are placed. Then, the CPU 201 causes the capping mechanism to cap the discharge port of the recording head and causes a pump connected to the capping mechanism to operate. Through these operations, the CPU 201 generates negative pressure within the capping mechanism and suctions and discharges foreign substances, such as thickened ink and air bubbles, from the discharge port, thereby refreshing ink in the discharge port. Using a wiper, the CPU 201 wipes (wipes clean) foreign substances, such as ink, attached to a discharge port surface of the recording head. A cleaning process is executed at a timing other than the initial setting time, such as before printing is started, or when a predetermined time elapses from the previous printing, or when the software is turned on after the operation ends due to an abnormality. Such a normal cleaning process and the initial-setting-time cleaning process may be different from each other. More specifically, at the initial setting time, to fill a flow path from the head to a nozzle or from the ink tank to the head with ink, the negative pressure suction force may be made stronger, or the amount of suction may be made greater, or the number of times of suction may be made greater, than that in the normal cleaning operation. Alternatively, ink in the recording head may be heated to reduce the viscosity of the ink.

When executing the initial-setting-time cleaning process, the CPU 201 detects an error occurring in the recording unit 212. The error detected at this time is, for example, a head incomplete attaching error or a carriage position error.

The head incomplete attaching error is an error where the ink cartridge (recording head) is incompletely attached to the carriage. For example, if the ink cartridge is incompletely attached to the carriage, the ink cartridge may protrude to the driving path of the carriage. In this case, when the carriage moves, the ink cartridge hits a predetermined component within the printer 101, and the carriage stops at the position of the component. For example, the CPU 201 detects the amount of movement of the carriage. Then, if the detected amount of movement corresponds to the amount of movement from the cartridge attaching position to the position of the component, the CPU 201 detects that the head incomplete attaching error occurs. Further, for example, if the ink cartridge is incompletely attached to the carriage, the ink cartridge comes out of the carriage during the movement of the carriage or the cleaning process. For example, the CPU 201 detects that the ink cartridge is attached to the carriage by the cartridge sensor. Then, if the cartridge sensor detects that the ink cartridge is not attached to the carriage during the movement of the carriage or the cleaning process, the CPU 201 detects that the head incomplete attaching error occurs. The head incomplete attaching error is solved by the user opening the cover and properly attaching the ink cartridge again. Thus, the printer 101 does not need to shift to the power supply off state to solve the head incomplete attaching error.

The carriage position error is an error where foreign substances are present in the driving path of the carriage. For example, if foreign substances are present in the driving channel of the carriage, the foreign substances impede the movement of the carriage, and the amount of movement of the carriage becomes small. Thus, for example, the CPU 201 detects the actual amount of movement of the carriage and the force required to drive the carriage (driving force). Then, if the actual amount of movement is small relative to the driving force, the CPU 201 detects that the carriage position error occurs. The carriage position error is solved by the printer 101 shifting to the power supply off state and the foreign substances being removed.

If detecting an error, the CPU 201 executes an error notification process for notifying the user of the detected error. More specifically, for example, the CPU 201 displays on the display unit 205 a screen for notifying the user of the detected error. When an error is detected, and if the printer 101 is connected to the host terminal 102 because the connection setting process is started in S304, the CPU 201 transmits, to the host terminal 102, information for displaying the detected error on the display unit 226 included in the host terminal 102. If an inquiry is received from the host terminal 102 to which the printer 101 is connected, the CPU 201 may execute the error notification process.

Next, in S310, the CPU 201 determines whether the process required at the initial setting time is completed. If the process required at the initial setting time is not completed (NO in S310), the CPU 201 repeats S310 until the processing is completed. If the process required at the initial setting time is completed (YES in S310), the processing proceeds to S311. In the present exemplary embodiment, the description is given on the assumption that the process required at the initial setting time is the initial-setting-time cleaning process. However, some embodiments are not limited to this form. For example, the process required at the initial setting time may include registration adjustment.

Next, in S311, the CPU 201 causes the LED of the display unit 205 to blink or displays a particular screen on the LCD of the display unit 205, thereby giving the user a notification indicating that that the initial setting process is completed. More specifically, for example, the CPU 201 displays on the LCD of the display unit 205 a screen indicating that the initial setting process is completed (e.g., screen 801 illustrated in FIG. 8) to the user. The notification method is not particularly limited. For example, the CPU 201 may give the notification by voice or sound using a speaker (not illustrated).

Figure 5:
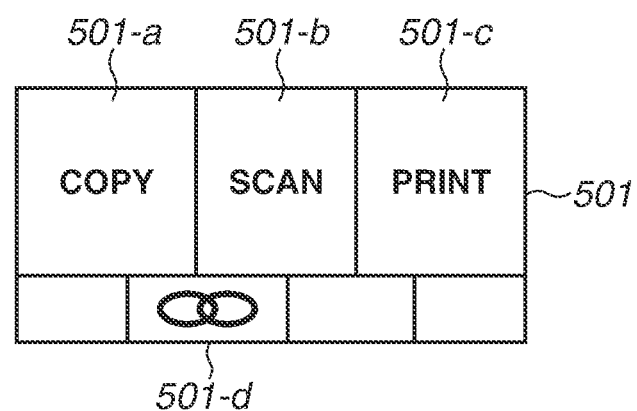
FIG. 5 illustrates an example of a screen displayed by the communication apparatus.

Next, in S312, the CPU 201 displays a home screen (e.g., screen 501 in FIG. 5) on the display unit 205. The home screen can include, for example, an area 501a for receiving an execution instruction to execute a copy process, an area 501b for receiving an execution instruction to execute a scan process, and an area 501c for receiving an execution instruction to execute a print process. The home screen can also include, for example, an area 501d for receiving a shift instruction to shift to the connection setting mode. Then, the CPU 201 ends the initial setting process. From this time, the CPU 201 can receive a user operation on the home screen and execute various processes.

As described above, in the present exemplary embodiment, the connection setting process is executed. The connection setting process includes a process to be started at the initial setting time and a process to be started after the initial setting ends. The connection setting process to be started at the initial setting time is a process to be started by executing S304 in FIG. 3. The process to be started after the initial setting ends is a process to be started by executing an operation on the printer 101 after the initial setting ends. Specifically, the operation on the printer 101 is, for example, the pressing of the area 501d or an operation on a particular area in a setting screen displayed after an operation is performed on an area other than the areas 501a to 501d of the home screen.

As described above, in the initial setting process, to make the initial setting of the printer 101, the user continuously executes various operations. At this time, in the middle of continuously performing the various operations, the user may unintentionally perform an operation for cancelling the connection setting mode of the printer 101. As a result, the following issues arise. The connection setting process to be started at the initial setting time is suspended or stopped without the user's intention. In this case, even if the user attempts to execute the connection setting process by operating the host terminal 102, since the printer 101 is not operating in the connection setting mode, the user cannot execute the connection setting process. In addition, it is troublesome for the user to cause the printer 101 to operate in the connection setting mode again.

In the present exemplary embodiment, a form for solving the above issues is described.

Figure 4:
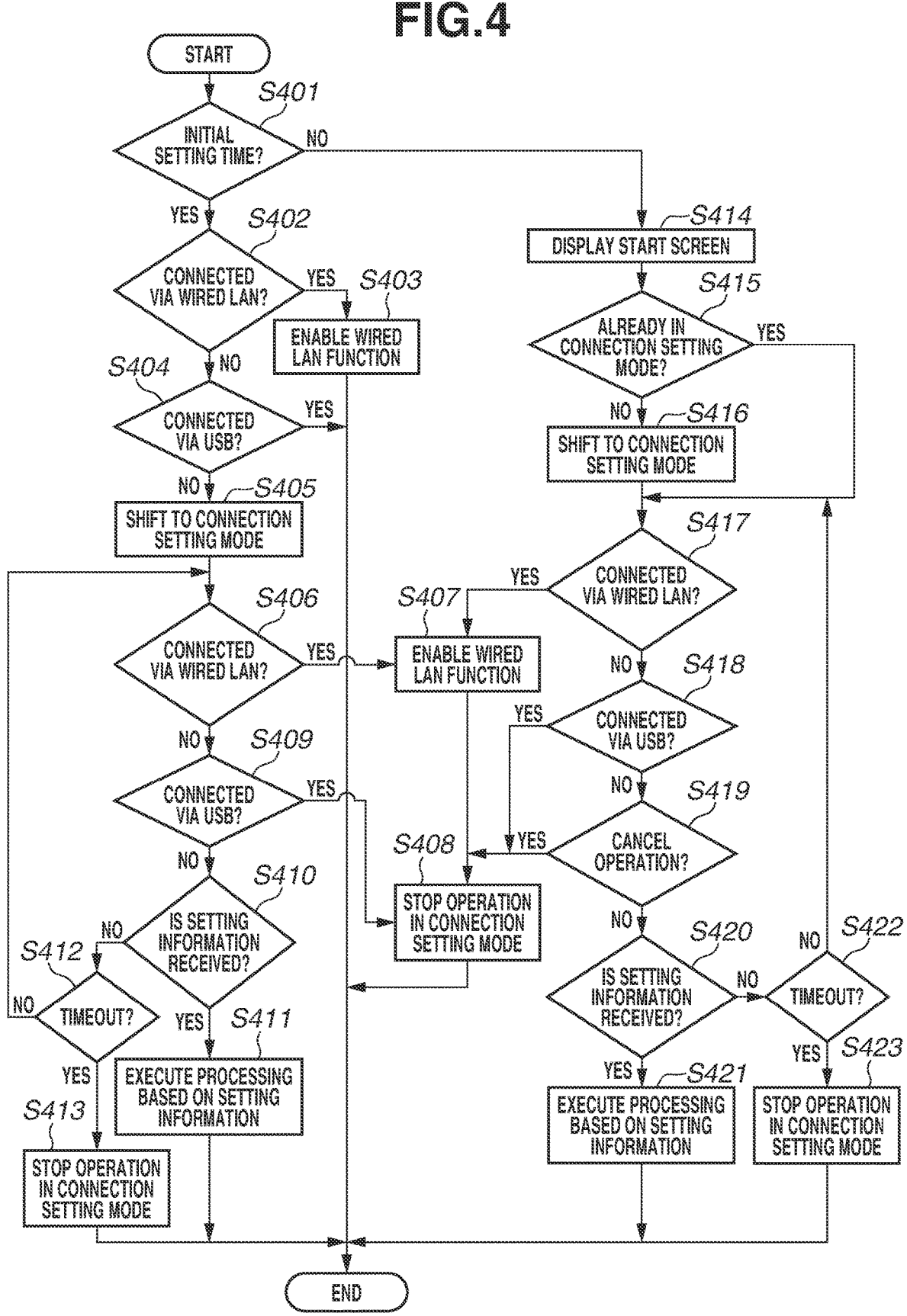
FIG. 4 is a flowchart illustrating a connection setting process executed by the communication apparatus.

FIG. 4 is a flowchart illustrating the connection setting process executed by the printer 101. This flowchart is implemented by the CPU 201 loading a control program regarding the flowchart stored in the ROM 202 or an external storage device (not illustrated) into the RAM 203 and executing the control program. The processing illustrated in this flowchart is, for example, a process to be started by executing S304 in FIG. 3. The processing illustrated in this flowchart is, for example, a process to be started when the area 501d is pressed.

First, in S401, the CPU 201 determines whether the connection setting process that is currently being executed is the process to be started at the initial setting time (or the process to be started after the initial setting ends). More specifically, the CPU 201 determines whether a process that is a trigger for starting this flowchart is the process of S304 or the pressing of the area 501d. If the connection setting process that is currently being executed is the process to be started at the initial setting time (YES in S401), the processing proceeds to S402. If the connection setting process that is currently being executed is not the process to be started at the initial setting time (NO in S401), the processing proceeds to S414.

In S402, the CPU 201 determines whether the printer 101 is connected to another apparatus via the wired LAN. If the printer 101 is connected to the other apparatus via the wired LAN (YES in S402), the processing proceeds to S403. If the printer 101 is not connected to the other apparatus via the wired LAN (NO in S402), the processing proceeds to S404.

In S403, the CPU 201 enables a wired LAN function of the printer 101 and shifts to a state where the printer 101 can communicate with the apparatus to which the printer 101 is connected via the wired LAN. In the present exemplary embodiment, in the state where the wired LAN function is enabled, a wireless LAN function is disabled. Then, the CPU 201 ends the processing.

On the other hand, in S404, the CPU 201 determines whether the printer 101 is connected to another apparatus via USB. If the printer 101 is connected to the other apparatus via USB (YES in S404), the CPU 201 ends the processing. If the printer 101 is not connected to the other apparatus via USB (NO in S404), the processing proceeds to S405.

As described above, in the present exemplary embodiment, in a case where the printer 101 is connected to another apparatus via the wired LAN or USB, the CPU 201 does not cause the printer 101 to operate in the connection setting mode. This is because if the printer 101 is connected to another apparatus via the wired LAN or USB, since the wired LAN or USB is determined as a communication method for communicating with another apparatus, the connection setting process does not need to be newly executed.

Figure 6:
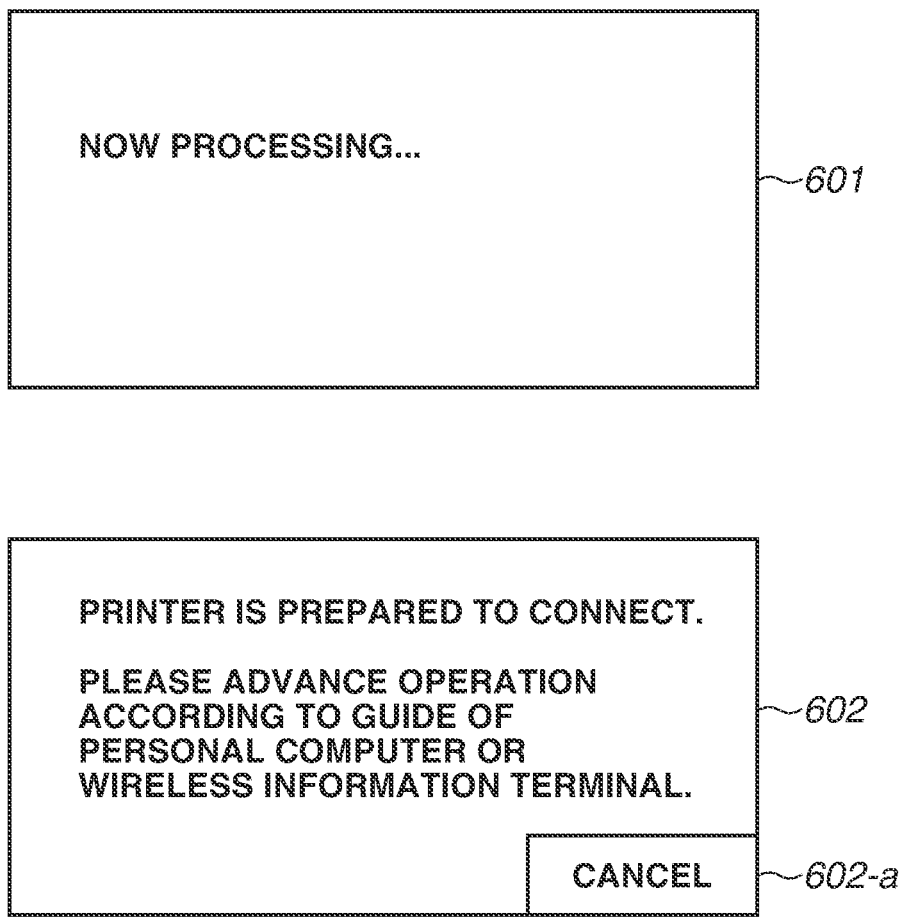
FIG. 6 illustrates examples of screens displayed by the communication apparatus.

In S405, the CPU 201 shifts the printer 101 to the connection setting mode. With this operation, the printer 101 enables the AP 209 for the connection setting mode. As a result, the printer 101 enters a state where the printer 101 periodically transmits a beacon including the SSID of the printer 101. Thus, in response to an AP search by a terminal apparatus (host terminal 102), the printer 101 can provide information included in the beacon. In this state, if a connection request is received from the host terminal 102, the printer 101 and the host terminal 102 exchange a connection parameter and connect to each other via the AP 209. At this time, the printer 101 may enable a BLE function and start broadcasting advertisement information. In the present exemplary embodiment, in the connection setting process at the initial setting time, even if the CPU 201 shifts to the connection setting mode, the CPU 201 does not notify the user that the printer 101 shifts to the connection setting mode. More specifically, the CPU 201 does not cause the LED of the display unit 205 to blink or does not perform particular display on the LCD based on the shift to the connection setting mode. Further, even if the CPU 201 shifts to the connection setting mode, the CPU 201 does not display a connection waiting screen (e.g., screen 602 in FIG. 6) for notifying the user that the printer 101 is prepared to connect to the host terminal 102. As described above, in the present exemplary embodiment, the processing in this flowchart and the processing in the flowchart illustrated in FIG. 3 can be executed in parallel. Thus, for example, even while the initial setting process in FIG. 3 is executed, the printer 101 can operate in the connection setting mode. Further, even after the initial setting process is completed and the home screen is displayed, the printer 101 can operate while maintaining the connection setting mode. Further, for example, even while the printer 101 executes any of various operations, such as printing, scanning, and copying, by a user operation (e.g., pressing of area 501a, 501b, or 501c) after the home screen is displayed, the printer 101 can operate in the connection setting mode.

In S406, the CPU 201 determines whether the printer 101 is connected to another apparatus via the wired LAN. This process is similar to that of S402. In this state, the printer 101 is operating in the connection setting mode, and the wireless LAN function is enabled. For example, in a form in which the wired LAN function is disabled in a state where the wireless LAN function is enabled, this process may be omitted. If the printer 101 is connected to the other apparatus via the wired LAN (YES in S406), the processing proceeds to S407. If the printer 101 is not connected to the other apparatus via the wired LAN (YES in S406), the processing proceeds to S409.

In S407, the CPU 201 enables the wired LAN function of the printer 101 and shifts to the state where the printer 101 can communicate with the apparatus to which the printer 101 is connected via the wired LAN. This process is similar to that of S403.

In S408, the CPU 201 stops the operation of the printer 101 in the connection setting mode. With this operation, the printer 101 disables the AP 209 for the connection setting mode and stops transmitting the beacon. The printer 101 disables the BLE function, stops broadcasting the advertisement information, and enters the state where the printer 101 does not newly receive an execution instruction to execute a pairing process. If a BLE connection to another apparatus is already established, and even if the printer 101 stops operating in the connection setting mode, the printer 101 may maintain the BLE connection. Then, the CPU 201 ends the processing.

On the other hand, in S409, the CPU 201 determines whether the printer 101 is connected to another apparatus via USB. This process is similar to that of S404. If the printer 101 is connected to the other apparatus via USB (YES in S409), the processing proceeds to S408. If the printer 101 is not connected to the other apparatus via USB (NO in S409), the processing proceeds to S410.

As described above, in the present exemplary embodiment, in a case where the printer 101 is connected to another apparatus via the wired LAN or USB, the CPU 201 stops the operation of the printer 101 in the connection setting mode. The case where the printer 101 is connected to another apparatus via the wired LAN or USB is a case where the printer 101 connects to another apparatus via the wired LAN or USB after the printer 101 shifts to the connection setting mode. This is because if the printer 101 connects to another apparatus via the wired LAN or USB, since the wired LAN or USB is determined as a communication method for communicating with another apparatus, the connection setting process does not need to be newly executed.

In S410, the CPU 201 determines whether setting information is received from the apparatus (host terminal 102 in this case) connected to the printer 101 operating in the connection setting mode. If the setting information is received (YES in S410), the processing proceeds to S411. If the setting information is not received (NO in S410), the processing proceeds to S412.

In S411, the CPU 201 executes processing based on the setting information received from the host terminal 102. More specifically, first, the CPU 201 cancels (stops) the connection setting mode. With this operation, the CPU 201 controls the printer 101 not to simultaneously operate in the connection setting mode and another mode (infrastructure connection mode or direct connection mode). By the cancellation of the connection setting mode, the connection between the host terminal 102 and the printer 101 is terminated once. Then, the CPU 201 sets a communication mode based on the received setting information. More specifically, if information corresponding to the infrastructure connection mode (AP information) is received as the setting information, the CPU 201 registers in the RAM 203 an AP corresponding to the setting information as an AP to be used in the infrastructure connection mode and executes a connection process for connecting to the AP. If a cryptographic key is required to use the AP, the CPU 201 registers the cryptographic key. Then, if the registration of the AP is appropriately completed, the CPU 201 sets the printer 101 to the infrastructure connection mode where the printer 101 can connect via the registered AP. In this way, the printer 101 operates in the state where the printer 101 can wirelessly connect to the host terminal 102 via the registered AP. Further, if information corresponding to the WFD mode or the software AP mode is received as the setting information, the CPU 201 transmits connection information for connecting to an AP corresponding to the WFD mode or the software AP mode to the host terminal 102 before cancelling the connection setting mode. After cancelling the connection setting mode, the CPU 201 enables the AP corresponding to the WFD mode or the software AP mode, and operates in the WFD mode or the software AP mode. In this state, if a connection request including the connection information transmitted before the connection setting mode is cancelled is received from the host terminal 102 as the transmission source of the setting information, the CPU 201 connects the printer 101 and the host terminal 102 using the P2P method. With this operation, the printer 101 operates in the state where the printer 101 can wirelessly connect to the host terminal 102 in a P2P manner. In the present exemplary embodiment, in the connection setting process at the initial setting time, even if processing based on setting information is executed, the CPU 201 does not give various notifications based on the execution of the processing based on the setting information. Then, the CPU 201 ends the connection setting process illustrated in FIG. 4.

On the other hand, in S412, the CPU 201 determines whether the connection setting process times out. The timeout of the connection setting process refers to the state where the printer 101 does not connect to an apparatus outside the printer 101 or does not receive setting information for a predetermined time or more after the printer 101 shifts to the connection setting mode in S405. If the connection setting process times out (YES in S412), the processing proceeds to S413. At this time, the CPU 201 may notify the user that the connection setting process times out or that a USB connection to a terminal apparatus is recommended, by displaying this information on the display unit 205. If the connection setting process does not time out (NO in S412), the processing returns to S406.

In S413, the CPU 201 stops the operation of the printer 101 in the connection setting mode. This process is similar to that of S408. Then, the CPU 201 ends the connection setting process illustrated in FIG. 4.

As described above, the connection setting process at the initial setting time is executed. In the present exemplary embodiment, the CPU 201 does not receive from the user a cancel operation for cancelling (stopping) the connection setting mode the operation of which is started in S405. More specifically, for example, the CPU 201 does not display a screen for receiving an input for cancelling the connection setting mode the operation of which is started in S405. Further, for example, even if the cancel button included in the printer 101 is pressed, the CPU 201 does not cancel the connection setting mode. In the present exemplary embodiment, the state where the CPU 201 does not receive the cancel operation from the user continues even after the initial setting is completed. Although the period during which the CPU 201 does not receive the cancel operation is not limited, the CPU 201 does not receive the cancel operation at least during the period from when the initial setting is started to when the initial setting is completed and the home screen is displayed. In the present exemplary embodiment, if a timeout occurs, if the power supply of the printer 101 is turned off, if the connection setting process is completed, or if the printer 101 connects to another apparatus based on a wired communication standard, such as the wired LAN or USB, the connection setting mode the operation of which is started in S405 is stopped and ended. In the present exemplary embodiment, the printer 101 can also directly receive the input of connection information (e.g., password) from the user and execute a connection process for connecting to an AP. In the present exemplary embodiment, also if the printer 101 thus connects to the AP based on the user input, the connection setting mode the operation of which is started in S405 is stopped and ended.

In S414, which is executed if the determination is NO (it is not the initial setting time) in S401, the CPU 201 displays a start screen for notifying the user that an operation in the connection setting mode is to be started. The start screen includes, for example, a button for receiving from the user a start instruction to start an operation in the connection setting mode. If the button is pressed, the processing proceeds to S415.

In S415, the CPU 201 determines whether the printer 101 is already in the connection setting mode. In a case where the area 501d is pressed in the state where the printer 101 is already operating in the connection setting mode by the connection setting process started at the initial setting time, the determination is YES. If the printer 101 is in the connection setting mode (YES in S415), the processing proceeds to S417. If the printer 101 is not in the connection setting mode (NO in S415), the processing proceeds to S416.

In S416, the CPU 201 causes the printer 101 to start operating in the connection setting mode. This process is similar to that of S405. Unlike at the initial setting time, at this time, the CPU 201 gives various notifications on the display unit 205 based on the shift to the connection setting mode. More specifically, for example, in the middle of shifting to the connection setting mode, the CPU 201 displays a screen (e.g., screen 601 in FIG. 6) indicating that the printer 101 is shifting to the connection setting mode. Then, in the state where the shift is completed and the printer 101 is operating in the connection setting mode, the CPU 201 displays the connection waiting screen for notifying the user that the printer 101 is operating in the connection setting mode and prepared to connect to the host terminal 102. The connection waiting screen is, for example, the screen 602 in FIG. 6. The screen 602 includes an area 602a for cancelling the connection setting mode. Unlike at initial setting time, at this time, the CPU 201 can receive a cancel instruction to cancel the connection setting mode. An operation that should be executed by the user in the connection setting process is described in a manual supplied with the printer 101. Accordingly, the screen 602 may display a message for notifying the user that the user advances an operation according to the manual. In the above description, as a notification based on the shift to the connection setting mode, a screen is displayed on the LCD. Alternatively, for example, as a notification based on the shift to the connection setting mode, the LED may blink.

In S417, the CPU 201 determines whether the printer 101 is connected to another apparatus via the wired LAN. This process is similar to that of S402. If the printer 101 is connected to the other apparatus via the wired LAN (YES in S417), the processing proceeds to S407. If the printer 101 is not connected to the other apparatus via the wired LAN (NO in S417), the processing proceeds to S418.

In S418, the CPU 201 determines whether the printer 101 is connected to another apparatus via USB. This process is similar to that of S404. If the printer 101 is connected to the other apparatus via USB (YES in S418), the processing proceeds to S408. If the printer 101 is not connected to the other apparatus via USB (NO in S418), the processing proceeds to S419.

At this time, unlike at the initial setting time, the printer 101 is operating in the connection setting mode by the user giving an explicit instruction to shift to the connection setting mode. In this case, the user is likely to intend to cause the printer 101 to establish a wireless connection. Thus, the CPU 201 may omit the processes of S417 and S418. In other words, even if the printer 101 is connected to another apparatus via the wired LAN or USB, the CPU 201 may maintain the operation in the connection setting mode.

In S419, the CPU 201 determines whether the CPU 201 receives from the user a cancel operation for cancelling (stopping) the connection setting mode the operation of which is started in S416. More specifically, for example, the cancel operation is the pressing of the area 602a displayed on the screen 601, or the pressing of the cancel button as a physical button. If the cancel operation is performed (YES in S419), the processing proceeds to S408. If the cancel operation is not performed (NO in S419), the processing proceeds to S420.

In S420, the CPU 201 determines whether setting information is received from the apparatus (host terminal 102 in this case) connected to the printer 101 operating in the connection setting mode. If the setting information is received (YES in S420), the processing proceeds to S421. If the setting information is not received (NO in S420), the processing proceeds to S422.

In S421, the CPU 201 executes processing based on the setting information received from the host terminal 102. This process is similar to that of S411. Unlike at the initial setting time, at this time, the CPU 201 gives various notifications on the display unit 205 based on the execution of the processing based on the setting information. More specifically, for example, in the middle of the execution of a connection process for connecting to an AP corresponding to the setting information, the CPU 201 displays a screen (e.g., screen 701 in FIG. 7) indicating that the printer 101 is executing the connection process for connecting to the AP. Then, if the connection to the AP is successful, the CPU 201 displays a screen (e.g., screen 702 in FIG. 7) for notifying the user that the connection to the AP is successful. If, on the other hand, the connection to the AP is failed, the CPU 201 displays a screen (e.g., screen 703 in FIG. 7) for notifying the user that the connection to the AP is failed. Then, the CPU 201 ends the connection setting process illustrated in FIG. 4.

On the other hand, in S422, the CPU 201 determines whether the connection setting process times out. This process is similar to that of S412. A time threshold used in the timeout determination in S422 and a time threshold used in the timeout determination in S412 may be different from each other. In the present exemplary embodiment, the time threshold used in the timeout determination in S422 is greater than the time threshold used in the timeout determination in S412. If the connection setting process times out (YES in S422), the processing proceeds to S423. If the connection setting process does not time out (NO in S422), the processing returns to S417.

In S423, the CPU 201 stops the operation of the printer 101 in the connection setting mode. This process is similar to that of S408. Then, the CPU 201 ends the connection setting process illustrated in FIG. 4.

FIG. 9 is a flowchart illustrating the connection setting process executed by the host terminal 102. This flowchart is implemented by the CPU 221 loading a control program regarding the flowchart stored in the ROM 222 or an external storage device (not illustrated) into the RAM 223 and executing the control program.

First, in S901, the CPU 221 receives an operation of the user and starts a wireless LAN setting application. The wireless LAN setting application is an application for setting a communication mode for the printer 101. The wireless LAN setting application may have another function, such as a function of transmitting a print job to the printer 101 and causing the printer 101 to execute printing. The wireless LAN setting application is a program stored in a storage device (not illustrated) within the host terminal 102 and is installed in advance on the host terminal 102 by the user. The following processing for setting a communication mode is implemented by the CPU 221 executing the wireless LAN setting application.

A description is given of an example where the printer 101 is set to the infrastructure connection mode by registering in the printer 101 an AP to be used in the infrastructure connection mode, using the wireless LAN setting application. The AP may be registered not using the wireless LAN setting application, but using a service on the Internet or other functions of the host terminal 102 and the printer 101 via a web browser. At this time, the CPU 221 temporarily saves, in the RAM 223, AP information regarding an AP to which the host terminal 102 is connected.

Next, in S902, via the communication unit 224, the CPU 221 searches for APs that the host terminal 102 can access. The search for the APs may be automatically executed when the wireless LAN setting application is started, or may be executed in response to an instruction from the user. The search for the APs is performed by the communication unit 224 receiving beacons transmitted from APs.

In S903, the CPU 221 displays on the display unit 226 a list of APs found by the AP search in S902 (AP search results). At this time, for example, the CPU 221 displays a list of the SSIDs of the APs. Alternatively, in S903, the CPU 221 may automatically extract and display an AP having an SSID in a format according to the above rule forming the SSID of the AP 209. At this time, if there is a plurality of SSIDs in the format according to the above rule, the plurality of SSIDs is displayed, and the user is allowed to select an SSID from the plurality of SSIDs. In this case, the process of S905 needs not be performed.

If the APs are displayed in S903, the user selects an AP within a communication apparatus as a setting target of a communication mode from the search results.

In S904, the CPU 221 detects that the selection of an AP by the user is received.

In S905, the CPU 221 determines whether the AP selected in S904 is the AP within the communication apparatus as the setting target of the wireless LAN setting application. More specifically, at this time, the CPU 221 determines whether the selected AP is an AP having an SSID in the format according to the above rule forming the SSID of the AP 209. If it is determined that the AP selected in S904 is not the AP within the communication apparatus as the setting target (NO in S905), the CPU 221 waits to detect the selection of an AP by the user again. At this time, the CPU 221 may display on the display unit 226 a screen for notifying the user that an inappropriate AP is selected. Alternatively, a configuration in which if an AP corresponding to the communication apparatus as the setting target is not present, or if an AP within a communication apparatus desired by the user is not present, the CPU 221 ends the processing, may be employed.

A configuration is described above in which the user is allowed to manually select the AP within the communication apparatus as the setting target of the communication mode in the processes of S903 to S905. However, some embodiments are not limited to this form. For example, the CPU 221 may automatically select, from the APs found in S902, an AP having an SSID in the format according to the above rule as the AP within the communication apparatus as the setting target of the communication mode.

If the AP (AP 209 in this case) within the communication apparatus (printer 101 in this case) as the setting target is selected in S905 (YES in S905), the CPU 221 exchanges a parameter (connection information) for the host terminal 102 and the printer 101 to wirelessly connect to each other. Connection information for connecting to the AP 209 is held in advance by the wireless LAN setting application. In this manner, the host terminal 102 connects to the AP 209 and establishes communication with the printer 101.

Next, in S906, the CPU 221 transmits to the printer 101 the AP information temporarily saved in the RAM 223 in S901 as setting information via the AP 209 to which the host terminal 102 has connected in S905. The printer 101 is set to the infrastructure connection mode in which the printer 101 can connect via the AP based on the AP information, by receiving the AP information.

Finally, in S907, the CPU 221 stops connecting to the AP 209 and connects to the AP based on the AP information temporarily saved in the RAM 223 in S901 again. Accordingly, the CPU 221 becomes capable of communicating with the printer 101 via the AP. At this time, the CPU 221 registers in the RAM 223 the printer 101 as a communication apparatus to which the host terminal 102 will connect from this time. Then, the CPU 221 ends the wireless LAN setting application.

The processes of S902 to S904 are not necessarily performed by the wireless LAN setting application. Alternatively, another application already installed in the host terminal 102 may search for the AP 209, and the wireless LAN setting application may acquire the result of the search.

In the above description, since the CPU 221 communicates with the printer 101 via the AP 209, the CPU 221 transmits the setting information to the printer 101 using a communication standard compliant with the IEEE 802.11 series (i.e., Wi-Fi®). However, some embodiments are not limited to this form. For example, the CPU 221 may transmit the setting information to the printer 101 using a communication standard different from a communication standard compliant with the IEEE 802.11 series. The communication standard used at this time is, for example, Bluetooth® Classic, Bluetooth® Low Energy, near-field communication, or Wi-Fi Aware. In such a form, while maintaining a connection using Wi-Fi to an AP used in the infrastructure connection mode, the CPU 221 can transmit setting information to the printer 101 using another communication standard.

In the above description, the CPU 221 sets the infrastructure connection mode for the printer 101. However, some embodiments are not limited thereto. For example, another communication mode, such as the WFD mode or the software AP mode, may be set for the printer 101. For example, a communication mode to be set for the printer 101 may be determined by receiving a selection by the user through a screen displayed by the wireless LAN setting application, or may be automatically determined by the wireless LAN setting application based on the communication environment of the host terminal 102. For example, when a communication mode is set for the printer 101, and if the host terminal 102 is connected to any of APs, the infrastructure connection mode is selected as the communication mode to be set for the printer 101. For example, when a communication mode is set for the printer 101, and if the host terminal 102 is not connected to any of APs, a communication mode using the P2P method, such as the WFD mode or the software AP mode, is selected as the communication mode to be set for the printer 101.

As described above, in the present exemplary embodiment, the printer 101 does not receive a cancel instruction to cancel the connection setting process to be started at the initial setting time. This can prevent the user from unintentionally performing a cancel operation and the printer 101 from stopping the connection setting mode without the user's intention.

In the present exemplary embodiment, the processing content is varied between the connection setting process to be started at the initial setting time and the connection setting process to be started based on a user operation after the initial setting is completed. More specifically, in the connection setting process to be started after the initial setting is completed, various notifications and various types of display that are not executed in the connection setting process to be started at the initial setting time are executed. In the connection setting process to be started after the initial setting is completed, a cancel instruction to cancel the connection setting process is received. This is because even if the user unintentionally cancels the connection setting process to be started based on a user operation after the initial setting is completed, the user can start the connection setting process again by executing the user operation again.

Other Exemplary Embodiments

In the above-described exemplary embodiment, the connection setting process in which a cancel instruction is not received is the process to be performed at the initial setting time of the printer 101. However, some embodiments are not limited to this. For example, the connection setting process in which a cancel instruction is not received may be executed when the wireless LAN setting of the printer 101 is disabled, or may be executed when an initialization process for initializing the printer 101 is performed. For example, when the power supply of the printer 101 is turned on, the connection setting process in which a cancel instruction is not received may be executed regardless of whether the printer 101 is in the initial setting state.

Some embodiments can also be achieved by the process of supplying a program for achieving one or more functions of the above exemplary embodiments to a system or an apparatus via a network or a storage medium, and the process of causing one or more processors of a computer of the system or the apparatus to read and execute the program.

Some embodiments can also be achieved by a circuit (e.g., an application-specific integrated circuit (ASIC)) for achieving one or more functions.

Some embodiments can also be achieved by performing the following process. This is the process of supplying software (program) for implementing the functions of the above exemplary embodiments to a system or an apparatus via a network or various recording media, and the process of causing a computer (CPU or microprocessor unit (MPU)) of the system or the apparatus to read and execute the program. The program may be executed by a single computer, or may be executed by cooperation of a plurality of computers. Not all the above processing needs to be implemented by software, and part or all of the processing may be implemented by hardware, such as an ASIC. The CPU may be not only a single CPU that performs all of the processing, but also a plurality of CPUs that appropriately cooperates to perform the processing.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-139165, which was filed on Jul. 29, 2019 and which is hereby incorporated by reference herein in its entirety.

What is claimed is:
1. A communication apparatus comprising:
one or more processors that are configured to implement:
a first control unit configured to cause the communication apparatus to start operating in a connection setting state for receiving connection information for connecting to an external apparatus from a terminal apparatus;

a reception unit configured to receive the connection information from the terminal apparatus in a state where the communication apparatus operates in the connection setting state;

an establishment unit configured to, in a case where the connection information is received from the terminal apparatus, establish a connection between the external apparatus and the communication apparatus using the connection information; and a second control unit configured to, based on a reception of the connection information from the terminal apparatus, cause the communication apparatus to stop operating in the connection setting state, wherein based on a power-supply-on operation for turning on a power supply of the communication apparatus being performed in a state where the power supply of the communication apparatus is off, the communication apparatus starts operating in the connection setting state, wherein based on a predetermined operation being performed on the communication apparatus in a state where the power supply of the communication apparatus is on, the communication apparatus starts operating in the connection setting state, wherein displaying, based on the operation in the connection setting state being started, a screen for receiving an operation for stopping the operation in the connection setting state started based on the power-supply-on operation being performed on a display unit of the communication apparatus is not executed, and wherein displaying, based on the operation in the connection setting state being started, a screen for receiving an operation for stopping the operation in the connection setting state started based on the predetermined operation being performed on the display unit of the communication apparatus is executed.

2. The communication apparatus according to claim 1, wherein based on the power-supply-on operation for turning on the power supply of the communication apparatus being performed in a state where an initial setting of the communication apparatus is not completed and the power supply of the communication apparatus is off, the communication apparatus starts operating in the connection setting state.

3. The communication apparatus according to claim 2, wherein the communication apparatus maintains the operation in the connection setting state, even after the initial setting is completed.

4. The communication apparatus according to claim 2, wherein the communication apparatus does not start operating in the connection setting state based on the initial setting being completed and the power-supply-on operation being performed.

5. The communication apparatus according to claim 2, wherein the initial setting includes a process of cleaning a component included in the communication apparatus.

6. The communication apparatus according to claim 1, wherein a screen indicating that the operation in the connection setting state is started is not displayed on the display unit of the communication apparatus.

7. The communication apparatus according to claim 6, wherein the communication apparatus starts operating in the connection setting state, based on the power-supply-on operation for turning on the power supply of the communication apparatus being performed in a state where the power supply of the communication apparatus is off, wherein the communication apparatus starts operating in the connection setting state, based on a predetermined operation being performed on the communication apparatus in a state where the power supply of the communication apparatus is on, wherein displaying, based on the operation in the connection setting state being started based on the power-supply-on operation being performed, the screen indicating that the operation in the connection setting state is started on the display unit of the communication apparatus is not executed, and wherein displaying, based on the operation in the connection setting state being started based on the predetermined operation being performed, the screen indicating that the operation in the connection setting state is started on the display unit of the communication apparatus is executed.

8. The communication apparatus according to claim 1, wherein in a case where the connection information is received from the terminal apparatus, the connection information is used to establish a connection between the external apparatus and the communication apparatus based on a first communication standard, and wherein in a case where a connection between another apparatus and the communication apparatus based on a second communication standard different from the first communication standard is already established, the communication apparatus does not start operating in the connection setting state.

9. The communication apparatus according to claim 8, wherein the first communication standard is a wireless communication standard, and wherein the second communication standard is a wired communication standard.

10. The communication apparatus according to claim 9, wherein the first communication standard is a Wi-Fi standard or a Bluetooth standard, and wherein the second communication standard is a wired local area network (LAN) standard or a Universal Serial Bus (USB) standard.

11. The communication apparatus according to claim 1, wherein in a case where the connection information is received from the terminal apparatus, the connection information is used to establish a connection between the external apparatus and the communication apparatus based on a first communication standard, and wherein based on, in a state where a connection between the communication apparatus operating in the connection setting state and the terminal apparatus is established, a connection between another apparatus and the communication apparatus based on a second communication standard different from the first communication standard being newly established, the communication apparatus stops operating in the connection setting state.

12. The communication apparatus according to claim 1, wherein based on an elapse of a predetermined time since the communication apparatus starts operating in the connection setting state, the communication apparatus stops operating in the connection setting state.

13. The communication apparatus according to claim 1, wherein the one or more processors are further configured to implement a reception unit configured to receive from a user a connection setting operation for executing a connection setting of the communication apparatus, wherein the communication apparatus stops operating in the connection setting state, based on the reception of the connection setting operation.

14. The communication apparatus according to claim 13, wherein the connection setting operation includes an operation for establishing a connection between the external apparatus and the communication apparatus by the user directly inputting the connection information to the communication apparatus.

15. The communication apparatus according to claim 1, wherein the connection setting state is a state for the communication apparatus to connect to the terminal apparatus in a peer-to-peer manner.

16. The communication apparatus according to claim 1, wherein the connection setting state is a state where a predetermined access point within the communication apparatus is enabled.

17. The communication apparatus according to claim 1, further comprising a printing unit configured to print an image on a recording medium.

18. A communication apparatus comprising:
one or more processors that are configured to implement:
a first control unit configured to cause the communication apparatus to start operating in a connection setting state for receiving connection information for connecting to an external apparatus from a terminal apparatus;
a reception unit configured to receive the connection information from the terminal apparatus in a state where the communication apparatus operates in the connection setting state;
an establishment unit configured to, in a case where the connection information is received from the terminal apparatus, establish a connection between the external apparatus and the communication apparatus using the connection information;
a second control unit configured to, based on a reception of the connection information from the terminal apparatus, cause the communication apparatus to stop operating in the connection setting state; and
a stop unit configured to, based on a stop button for stopping processing that is being executed by the communication apparatus being pressed, stop the processing being executed by the communication apparatus,
wherein the communication apparatus starts operating in the connection setting state, based on a power-supply-on operation for turning on a power supply of the communication apparatus being performed in a state where the power supply of the communication apparatus is off,
wherein based on a predetermined operation being performed on the communication apparatus in a state where the power supply of the communication apparatus is on, the communication apparatus starts operating in the connection setting state,
wherein even in a case where the stop button is pressed, the communication apparatus does not stop the operation in the connection setting state started based on the power-supply-on operation being performed, and
wherein in a case where the stop button is pressed, the communication apparatus stops the operation in the connection setting state started based on the predetermined operation being performed.

19. A communication apparatus comprising:
one or more processors that are configured to implement:
a first control unit configured to cause the communication apparatus to start operating in a connection setting state for receiving connection information for connecting to an external apparatus from a terminal apparatus;
a reception unit configured to receive the connection information from the terminal apparatus in a state where the communication apparatus operates in the connection setting state;
an establishment unit configured to, in a case where the connection information is received from the terminal apparatus, establish a connection between the external apparatus and the communication apparatus using the connection information; and
a second control unit configured to, based on a reception of the connection information from the terminal apparatus, cause the communication apparatus to stop operating in the connection setting state,
wherein displaying, based on the operation in the connection setting state being started, a screen for receiving an operation for stopping the operation in the connection setting state on a display unit of the communication apparatus is not executed, and
wherein based on a power-supply-on operation for turning on a power supply of the communication apparatus being performed in a state where an initial setting of the communication apparatus is not completed and the power supply of the communication apparatus is off, the communication apparatus starts operating in the connection setting state.

20. A communication apparatus comprising:
one or more processors that are configured to implement:
a first control unit configured to cause the communication apparatus to start operating in a connection setting state for receiving connection information for connecting to an external apparatus from a terminal apparatus;
a reception unit configured to receive the connection information from the terminal apparatus in a state where the communication apparatus operates in the connection setting state;
an establishment unit configured to, in a case where the connection information is received from the terminal apparatus, establish a connection between the external apparatus and the communication apparatus using the connection information; and
a second control unit configured to, based on a reception of the connection information from the terminal apparatus, cause the communication apparatus to stop operating in the connection setting state,
wherein displaying, based on the operation in the connection setting state being started, a screen for receiving an operation for stopping the operation in the connection setting state on a display unit of the communication apparatus is not executed,
wherein the communication apparatus starts operating in the connection setting state, based on the power-supply-on operation for turning on the power supply of the communication apparatus being performed in a state where the power supply of the communication apparatus is off,
wherein the communication apparatus starts operating in the connection setting state, based on a predetermined operation being performed on the communication apparatus in a state where the power supply of the communication apparatus is on,
wherein displaying, based on the operation in the connection setting state being started based on the power-supply-on operation being performed, a screen indicating that the operation in the connection setting state is started on the display unit of the communication apparatus is not executed, and wherein displaying, based on the operation in the connection setting state being started based on the predetermined operation being performed, the screen indicating that the operation in the connection setting state is started on the display unit of the communication apparatus is executed.

\* \* \* \* \*